May 5, 1942.  K. P. FUHRMANN  2,281,570
METHOD OF MAKING A CONTAINER
Filed June 28, 1940   2 Sheets-Sheet 1

INVENTOR
Karl P. Fuhrmann
his attorney

INVENTOR
Karl P. Fuhrmann

Patented May 5, 1942

2,281,570

UNITED STATES PATENT OFFICE 2,281,570

METHOD OF MAKING CONTAINERS

Karl P. Fuhrmann, Portsmouth, Ohio, assignor to Wheeling Steel Corporation, Wheeling, W. Va., a corporation of Delaware Application June 28, 1940, Serial No. 342,963

2 Claims. (Cl. 113—120)

This invention relates to a method of fabricating a container. It relates particularly to the art of making sanitary containers for shipping food products, which containers must be free from internal cracks and crevices. However, in its broader aspects the invention is not limited to container manufacture but may be otherwise applied.

The invention is applicable to the making of containers by employing as a blank or intermediate product a container made in accordance with the disclosure of Mangold application Serial No. 342,964, filed of even date herewith. In said Mangold application there is disclosed the making of a sanitary container by welding a bottom to a container body and employing an outward bead in the container body into which the internal tapered welding roll projects whereby to avoid scoring the inner surface of the container with the point of the welding roll and short circuiting of the welding current by contact of the point of the welding roll with the container body. While containers made according to the Mangold application are generally satisfactory it is sometimes undesirable to have the bead provided by Mangold in the finished container as it may be regarded as unsightly or be objectionable for some reason. Moreover, there is a possibility that if the edge of the bottom used by Mangold should not lie accurately in a plane perpendicular to the axis of the cylinder defined by the outer surface of the bottom flange a crack or crevice might be formed in the container.

I find that decidedly advantageous results can be obtained by compacting, consolidating and smoothing the joint between the bottom and the container body. This seems to result in filling in any slight crevices or depressions which may occur and produces a container which to all intents and purposes is perfectly smooth internally. I also preferably flatten out the bead provided by Mangold as referred to above. The invention, however, is not limited to application to beaded blanks, as it is also of value when applied to unbeaded blanks. The invention is applicable broadly to the joining of metal pieces for the manufacture of sanitary structures,—that is, structures made of a plurality of pieces of metal whose surfaces merge together so perfectly that no substantial crack or crevice is left between them.

The invention will be described as embodied in and applied to the manufacture of a sanitary container such as a milk can made out of a blank or intermediate product as disclosed in said Mangold application. The Mangold blank is subjected to compacting, consolidating and smoothing action at the joint between the container body and the bottom which is welded thereto, which action apparently results in flowing of the metal sufficiently to fill up any small cracks or crevices which may be present. Such action also eliminates the bead provided by Mangold so that the finished container may have a smooth exterior in the zone of the joint between the body and bottom. However, as above mentioned, the invention is also applicable to structures which are not beaded and in which the compacting, consolidating and smoothing action has its effect only on the metal at the welded joint. This action is preferably obtained by rolls between which the work passes to be pressed and worked.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same, in which Figure 1 is a fragmentary elevational view of a rolling machine which except for the design of the rolls and the particular action of the rolls on the work may be of standard construction;

Figure 1:
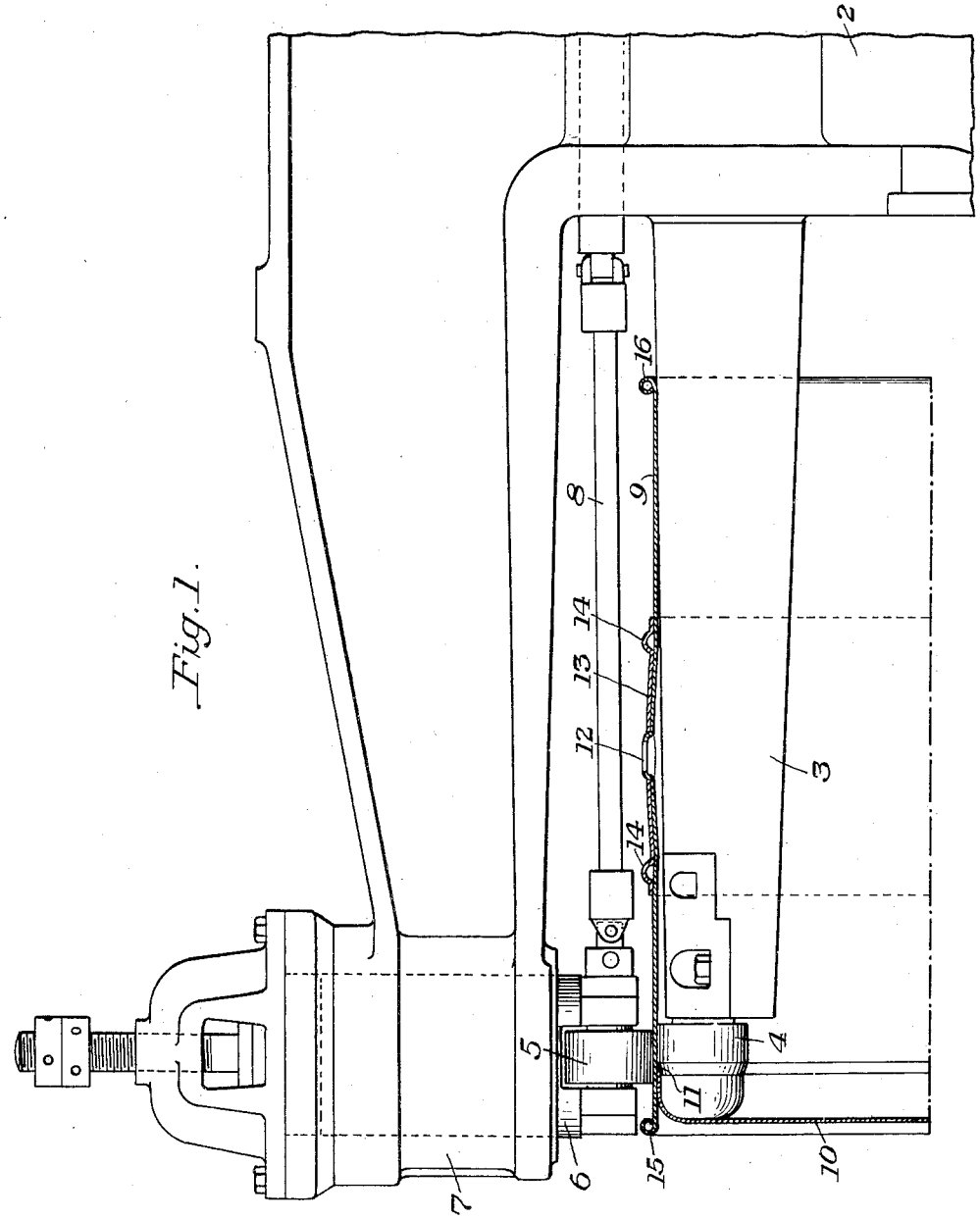
Figure 2:
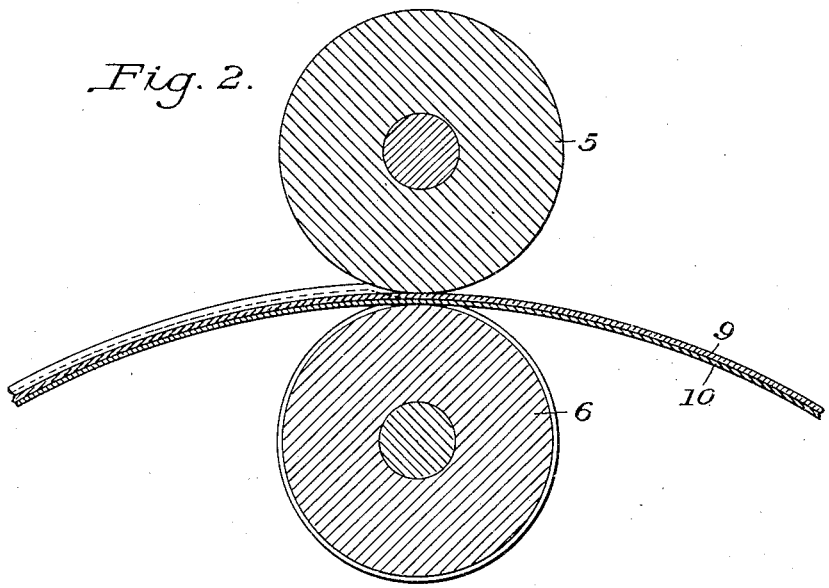
Figure 2 is an enlarged cross-sectional view taken perpendicular to the axes of the rolls showing their effect upon the work.

Referring now more particularly to the drawings, the rolling machine shown in Figure 1 may be of standard construction except for the special rolls which I provide and the special action which they have on the work. Similar machines are widely used for pressure electric welding. The rolling machine comprises a frame 2 having an anvil 3 provided at its outer end with an internal pressure roll 4. In the particular machine shown the roll 4 is not driven but turns by frictional engagement with the work. Cooperating with the internal roll 4 is an external pressure roll 5. The roll 5 is carried by a head 6 vertically movable within a cylinder 7 and is driven through connections 8. Since the general structure of the rolling machine may be standard and is well known to any person skilled in the art it will not be described further.

There is shown a container body 9 and a head or bottom 10 positioned within the body 9 and pressure welded thereto at 11. The body 9 has an opening 12 shown purely diagrammatically in Figure 1 and which may be of any desired construction and provided with suitable closure means. A rolling ring band 13 may be provided having rolling rings 14. The body 9 is beaded at the bottom at 15 and at the top at 16. The top of the container is adapted to be closed by a cover making a sanitary joint therewith. The bottom 10 in the form shown in the drawings is of generally pan or dished shape having a substantially flat bottom portion 17 surrounded by a flange 18 which is joined to the bottom portion 17 by an intermediate curved portion 19. The flange 18 extends at approximately right angles to the plane of the bottom portion 17 so that the outer surface of the flange is substantially cylindrical. The edge of the bottom lies substantially in a plane perpendicular to the axis of the cylindrical outer surface of the flange 18.

Figure 3:
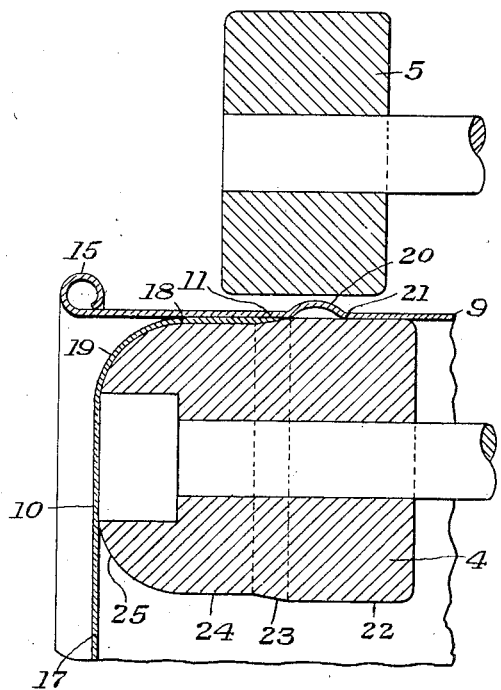
Figure 3 is a cross-sectional view taken parallel to the axes of the rolls showing the rolls just prior to the rolling operation.
Figure 4:
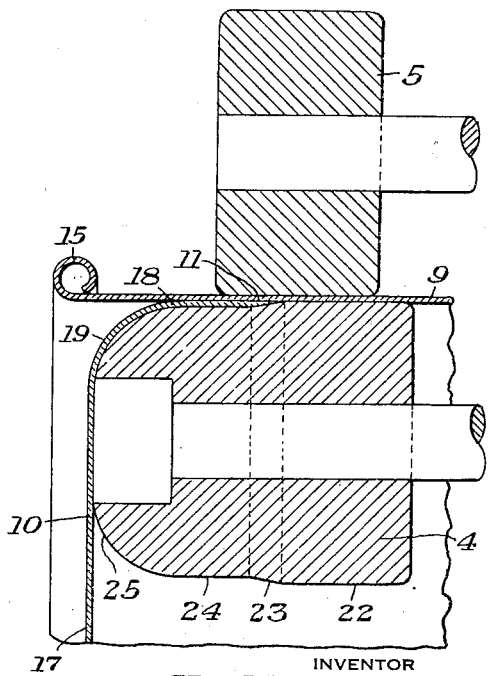
Figure 4 is a view similar to Figure 3 showing the rolls at the end of the rolling operation.

In Figure 3 the container or blank is shown prior to the compacting, consolidating and smoothing step which in the form of the invention illustrated is effected by the rolls 4 and 5. The bottom 10 has been welded to the body 9 at 11. Substantially tangent to the inclined surface of the joint as shown in Figure 3 there is in the container body 9 an outward depression or bead 20. This outward depression or bead is provided in the blank in accordance with the disclosure of said Mangold application. It is preferably formed continuously and circumferentially of the container body and may be formed therein by rolling in well known manner. The bead 20 preferably merges into the surface of the body by curved junction portions or fillets 21.

As will be seen from Figure 3, prior to the rolling of the blank its outer surface is cylindrical except for the outward bead 20 and its inner surface is cylindrical above the bead 20, conical at the welded joint for a short distance below the bead 20 and then cylindrical, only to reduced diameter, below the joint. The pressure roll 4 is designed to conform to the inner surface of the blank except for the bead 20. It has a portion 22 which is cylindrical and of relatively great diameter, an intermediate conical portion 23 and a portion 24 which is cylindrical and of relatively small diameter. The end 25 of the roll 4 is shaped to engage and fit the corner of the blank as shown in Figure 3. Thus the roll 4 fits against the inner surface of the blank except for the bead 20. The roll 5 is a plain cylindrical roll and is positioned to press the blank against the roll 4 opposite the bead 21 and the joint 11 and for a short distance above the bead and below the joint.

The blank is introduced to the rolls as shown in Figure 3 whereupon the roll 5 is moved down and driven through the connections 8 to firmly press and roll the blank between the rolls 4 and 5. Since the roll 4 conforms to the interior of the blank except for the bead 20 such bead is rolled out and eliminated entirely, but otherwise the general conformation of the blank remains the same. However, an important function of the rolling is to compact, consolidate and smooth the joint so as to eliminate any small cracks, crevices or depressions therein and render the same substantially perfectly smooth interiorly of the container so that no particles or foreign matter can become lodged therein in such a way that they cannot easily be removed upon cleaning. The blank may if desired be held at its forward end against elongation so that the rolling out of the bead 20 will result in substantial consolidation and increase in density of the blank at and adjacent the joint. Even though the blank be not held against elongation, the pressure exerted is preferably such that there will be some consolidation and increase in density of the metal at and adjacent the joint. By thus increasing the density of the metal at and adjacent the joint not only are any minute cracks or crevices eliminated but the metal is rendered the more resistant to wear and abrasion and is strengthened by the cold working imparted by the rolls.

The invention in like manner accomplishes important results when used on an unbeaded blank. The compacting, consolidating and smoothing step is particularly advantageous when employed in connection with a welded joint and I contemplate welding two metal members together and then compacting, consolidating and smoothing the joint under various circumstances and in the fabrication of various products.

While I have shown and described a present preferred embodiment of the invention and a present preferred method of practicing the same it is to be distinctly understood that the invention is not limited thereto but may be otherwise variously embodied and practiced within the scope of the following claims.

I claim:

1. A method of joining metal blanks comprising providing a first blank having an elongated depression therein and a second blank adapted to be joined to the first blank, positioning the second blank against the first blank with an edge of the second blank adjacent said depression, operating on the thus assembled blanks by welding means extending into said depression to weld them together, said depression providing for proper positioning of the welding means relatively to the assembled blanks, and thereafter pressing out said depression.

2. A method of making a container comprising providing a peripherally closed container body blank having an elongated depression extending generally peripherally thereof and a closure blank adapted to be joined to the body blank, assembling the closure blank with the body blank with an edge of the closure blank adjacent said depression, operating on the thus assembled blanks by welding means extending into said depression to weld them together, said depression providing for proper positioning of the welding means relatively to the assembled blanks, and thereafter removing said depression.

KARL P. FUHRMANN.